United States Patent
Feldmeier

(10) Patent No.: US 8,485,909 B2
(45) Date of Patent: Jul. 16, 2013

(54) TORSIONAL VIBRATION DAMPER AND SPINDLE

(75) Inventor: Fritz Feldmeier, Nuremberg (DE)

(73) Assignee: Paul Mueller GmbH & Co. KG Unternehmensbeteiligungen, Nuremberg (DE)

( * ) Notice: Subject to any disclaimer, the term of this patent is extended or adjusted under 35 U.S.C. 154(b) by 0 days.

(21) Appl. No.: 12/998,908

(22) PCT Filed: Dec. 17, 2009

(86) PCT No.: PCT/DE2009/075077
§ 371 (c)(1),
(2), (4) Date: Jun. 15, 2011

(87) PCT Pub. No.: WO2010/069309
PCT Pub. Date: Jun. 24, 2010

(65) Prior Publication Data
US 2011/0244969 A1    Oct. 6, 2011

(30) Foreign Application Priority Data
Dec. 19, 2008    (EP) .................................... 08172384

(51) Int. Cl.
*F16D 3/64*    (2006.01)
(52) U.S. Cl.
USPC .......................................................... 464/83
(58) Field of Classification Search
USPC ............................................... 464/83, 89–91
See application file for complete search history.

(56) References Cited

U.S. PATENT DOCUMENTS

| | | | |
|---|---|---|---|
| 2,520,004 A | 8/1950 | Gondek | |
| 2,614,670 A | 10/1952 | Heintz | |
| 2,624,436 A | 1/1953 | Gamble | |
| 2,793,729 A | 5/1957 | Cobb | |
| 2,803,324 A | 8/1957 | Dodge | |
| 2,812,839 A | 11/1957 | Cobb | |
| 3,324,980 A | 6/1967 | Rojic et al. | |
| 4,327,822 A * | 5/1982 | Vogele et al. | 192/45.1 X |
| 4,998,605 A | 3/1991 | Ferris | |
| 5,052,533 A | 10/1991 | Carey et al. | |
| 5,445,255 A | 8/1995 | Rutke et al. | |
| 5,607,036 A | 3/1997 | Costin | |
| 7,506,738 B2 * | 3/2009 | Muramatsu et al. | 192/45.1 |

FOREIGN PATENT DOCUMENTS

| | | |
|---|---|---|
| DE | 40 32 915 | 4/1992 |
| DE | 4032915 * | 4/1992 |
| JP | 2008014427 * | 1/2008 |
| WO | WO 03/072968 | 9/2003 |

OTHER PUBLICATIONS

International Search Report of PCT/DE2009/075077, Mar. 19, 2010.

* cited by examiner

*Primary Examiner* — Gregory Binda
*Assistant Examiner* — Josh Skroupa
(74) *Attorney, Agent, or Firm* — Collard & Roe, P.C.

(57) ABSTRACT

A torsional vibration damper for coupling two machine parts disposed coaxially to each other, in particular for coupling a cylindrical inner surface of a first machine part to a cylindrical outer surface of a second machine part, has a plurality of clamping bodies and a plurality of intermediate elements. The intermediate elements have higher elasticity than the clamping bodies and are disposed between adjoining clamping bodies.

13 Claims, 4 Drawing Sheets

TORSIONAL VIBRATION DAMPER AND SPINDLE

CROSS REFERENCE TO RELATED APPLICATIONS

This application is the National Stage of PCT/DE2009/075077 filed on Dec. 17, 2009, which claims priority under 35 U.S.C. §119 of European Application No. 08172384.3 filed on Dec. 19, 2008, the disclosure of which is incorporated by reference. The international application under PCT article 21(2) was not published in English.

The invention relates to a torsional vibration damper and to a spindle.

The torsional vibration dampers serve to suppress or reduce torsional vibrations in order especially to keep vibration amplitudes small and to influence the resonant frequency. Torsional vibrations are understood here as meaning in particular oscillating rotational movements about an axis. They are excited by periodical sudden torques or torques proceeding randomly in time. Rotational vibrations are generally undesirable phenomena and disturb the running of machines and may lead to malfunctions.

It is the object of the present invention to make available a particularly simply constructed and at the same time effective torsional vibration damper and a particularly advantageously mounted spindle.

This object is by a torsional vibration damper as described in the claims.

The torsional vibration damper according to the invention for coupling two machine parts arranged coaxially with respect to each other, in particular for coupling a first cylindrical inner surface of a first machine part to a cylindrical outer surface of a second machine part, has a multiplicity of clamping bodies and a multiplicity of intermediate elements, wherein the intermediate elements are more elastic than the clamping bodies and are arranged between adjacent clamping bodies.

Such a construction provides a torsional vibration damper which, firstly, reliably transmits torques and, secondly, is torsionally elastic to a certain extent. Depending on the elasticity of the intermediate elements used and on the configuration of the clamping elements used, the torsional elasticity of the torsional vibration damper and the maximum torque the latter is capable of transmitting can be influenced.

In addition, the greater elasticity of the intermediate elements in comparison to the clamping bodies increases the deformability of the torsional vibration damper and thereby facilitates the installation thereof between the machine parts which are to be coupled.

The damping of torsional vibrations with the torsional vibration damper according to the invention is obtained in particular by internal friction in the intermediate element. The material or the materials from which the intermediate element is constructed therefore preferably has high internal damping. In this case, use is made in particular of the damping properties of, for example, rubber and of plastics filled with specific fillers. In a particularly preferred manner, a fibrous material can be used as a filler within the intermediate elements in order to reinforce the internal damping of the intermediate elements.

The material or the materials from which the intermediate element is constructed preferably have a Shore hardness of 50 Shore B to 100 Shore B, in particular of greater than 70 Shore B. The Shore hardness is a widely used characteristic variable for testing plastics and elastomers and is described in the standards DIN 53505, ISO 868 and ISO 7619.

The clamping bodies are configured in particular as clamping bodies as used in freewheels, i.e. in directional couplings, which transmit or support a torque in one direction by means of a frictional connection and permit idling in the opposite direction. Furthermore, the clamping bodies preferably consist of a metallic material, for example of a steel material. The intermediate elements accordingly then have an elasticity which is greater than the elasticity of metallic materials.

In a preferred embodiment, the intermediate elements completely fill the region present in the radial direction between the clamping bodies, i.e. the intermediate space between two adjacent clamping bodies. That is to say, the region present in the circumferential direction between the clamping bodies is completely filled by the intermediate elements. As a result, the cylindrical inner surface and the cylindrical outer surface of the machine parts which are to be coupled are in contact over the entire circumference thereof with the intermediate elements. This results in a particularly uniform and secure contact connection of the torsional vibration damper with the machine parts which are to be coupled.

In a further preferred embodiment, each clamping body has an outer contact surface for forming frictional contact with an outer clamping track, in particular with a cylindrical inner surface of a first machine part, and an inner contact surface for forming frictional contact with an inner clamping track, in particular with a cylindrical outer surface of a second machine part.

In a further preferred embodiment, the region placed in the circumferential direction between the clamping bodies, i.e. the intermediate space between the clamping bodies, is not completely filled with the intermediate elements. As a result, contact surfaces of the clamping bodies, which contact surfaces can enter into frictional contact with the machine parts which are to be coupled, remain free to an increased extent. The torsional vibration damper here can be configured in particular as a freewheel, i.e. can transmit or support a torque in one direction by means of a frictional connection and can permit idling in the opposite direction.

In an advantageous manner, the intermediate elements of the torsional vibration damper according to the invention are designed so as to fix the clamping bodies in position and to cushion said clamping bodies. By means of simultaneous fixing and cushioning of the clamping bodies by the intermediate elements, a particularly compact construction of the torsional vibration damper is possible.

If the intermediate elements consist of an elastic material having high internal damping, for example of natural rubber, then the tilting movement upon coiling of the clamping bodies leads to deformation of the damping material of the intermediate elements, which material is arranged between the clamping bodies, and therefore to dissipation of vibrational energy, this leading to particularly pronounced damping by the torsional vibration damper.

In one advantageous embodiment, the intermediate elements are connected to the clamping bodies. In particular, the intermediate elements can be connected to the clamping bodies in a cohesively bonded manner, this leading to a particularly reliable and stable bond between the intermediate elements and clamping bodies and thereby, for example, improving the handleability of the torsional vibration damper. The connection in a cohesively bonded manner can be designed here, for example, as an adhesive connection. The intermediate elements may also be configured as a casting compound or a plurality of casting compounds and the connection in a cohesively bonded manner may be produced by a casting process in which the clamping bodies are—at least partially—enclosed by the casting compound or casting compounds. It is also possible to produce the intermediate elements from an injection molding compound or injection molding compounds and to connect the intermediate elements to the clamping bodies with the aid of an injection molding process.

In a further advantageous embodiment, the intermediate elements correspond in contour to the contour of the adjacent clamping bodies. Such a configuration of the contour permits a particularly reliable connection between the intermediate element and the clamping bodies adjacent thereto.

In an advantageous embodiment, at least one clamping body is arranged tilted in relation to the radial direction between adjacent intermediate elements. As a result, the damping action of the torsional vibration damper and the maximum torque which the latter can transmit can be made dependent on the direction of the relative movement between the machine parts to be coupled.

In a further advantageous embodiment, two clamping bodies arranged adjacent to each other are bonded each tilted in an opposite direction in relation to the radial direction into the intermediate elements. As a result, the damping action of the torsional vibration damper and the maximum torque which the latter can transmit can likewise be made dependent on the direction of the relative movement between the machine parts to be coupled.

In an advantageous manner, the intermediate elements can consist of a plurality of different materials. It is firstly possible in this case for, for example, intermediate elements which are adjacent to one another to consist of different materials, and, secondly it is also possible for one intermediate element itself to be constructed from different materials. Overall, the variability and adaptability of the torsional vibration damper to various applications are increased as a result.

In a further advantageous embodiment, the elasticity of at least one intermediate element varies along the radial direction. This variation in the elasticity can be achieved, for example, by the intermediate element being constructed from different materials or by a gradual variation in the elasticity of the material used. The variation in the elasticity likewise increases the adaptability of the torsional vibration damper.

Depending on the desired field of use and on the desired elasticity, in preferred embodiments the intermediate elements can be produced at least partially from silicone material, from thermoplastic polymers, from vulcanized natural rubber, from thermosetting polymers (for example synthetic resin) or from a mixture of the abovementioned materials. All of the intermediate elements here may have the same material composition. However, it is also possible to vary the material composition from intermediate element to intermediate element. This increases the variability of the torsional vibration damper and the adaptability thereof to various applications.

In a further advantageous embodiment, the torsional vibration damper is of strip-shaped design. By this means, the torsional vibration damper can be produced as an endless strip. Depending on the production, the torsional vibration damper can then be divided to the desired peripheral length and placed between two machine parts arranged coaxially with respect to each other, in particular between a cylindrical inner surface of a first machine part and a cylindrical outer surface of a second machine part.

In a further advantageous embodiment, the torsional vibration damper is of annular design. As a result, the torsional vibration damper can be arranged particularly simply between two coaxially arranged machine elements.

The spindle according to the invention is designed in particular as a motor spindle and has a torsional vibration damper according to the invention.

The invention is explained in more detail with reference to exemplary embodiments in the figures of the drawings, in which.

Figure 1:
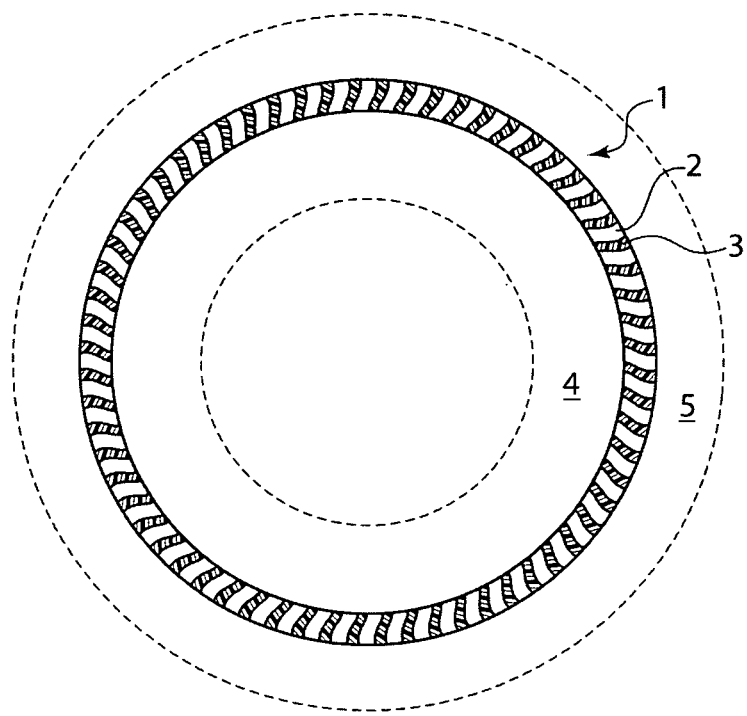
FIG. 1 shows a first embodiment of the torsional vibration damper.

FIG. 1 shows a torsional vibration damper 1 with a multiplicity of clamping bodies 2 and intermediate elements 3, wherein, in the figures, only one clamping body 2 and one intermediate element 3 in each case is provided with a reference number as a rule. The torsional vibration damper 1 is of annular design and the clamping bodies 2 are distributed uniformly over the circumference. The torsional vibration damper 1 is arranged between a cylindrical outer surface of a machine part 4 and a cylindrical inner surface of a machine part 5. The two machine parts 4 and 5 are oriented concentrically with respect to each other. The clamping bodies 2 are arranged tilted in relation to the radial direction between adjacent intermediate elements 3. In more precise terms, the clamping bodies 2 are embedded counterclockwise in the intermediate elements 3 such that in particular a torque can be transmitted in the clockwise direction.

Figure 2:
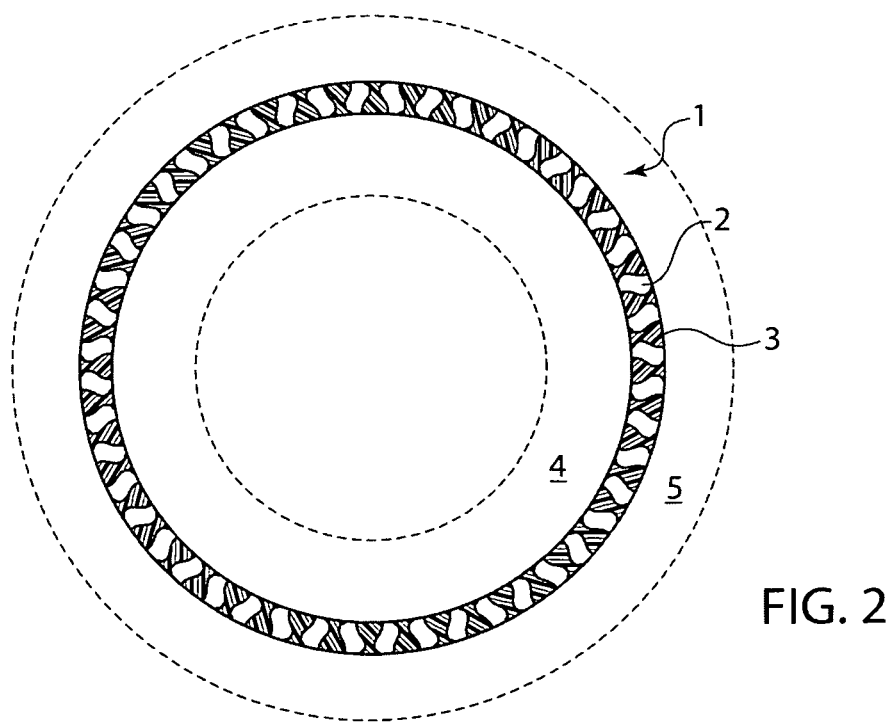
FIG. 2 shows a second embodiment of the torsional vibration damper.

FIG. 2 shows a further torsional vibration damper 1 with a multiplicity of clamping bodies 2 and intermediate elements 3. The torsional vibration damper 1 in FIG. 2 is likewise of annular design and the clamping bodies 2 are distributed uniformly over the circumference. The torsional vibration damper 1 is likewise arranged between a cylindrical outer surface of a machine part 4 and a cylindrical inner surface of a machine part 5. Two adjacent clamping bodies 2 tilted in opposite directions to each other are in each case embedded here in the intermediate elements. As a result; there is the possibility of transmitting a high torque in both directions of rotation.

In the torsional vibration dampers 1 illustrated in FIG. 1 and FIG. 2, the intermediate elements 3 completely fill the region present in the radial direction between the clamping bodies 2. As a result, the clamping bodies 2 and the intermediate elements 3 form contact with the corresponding cylindrical surfaces of the machine parts 4 and 5, and the cylindrical outer surface of the machine part 4 and the cylindrical inner surface of a machine part 5 are in contact over the entire circumference thereof—in an alternating manner by a clamping body 2 and an intermediate element 3.

Figure 3:
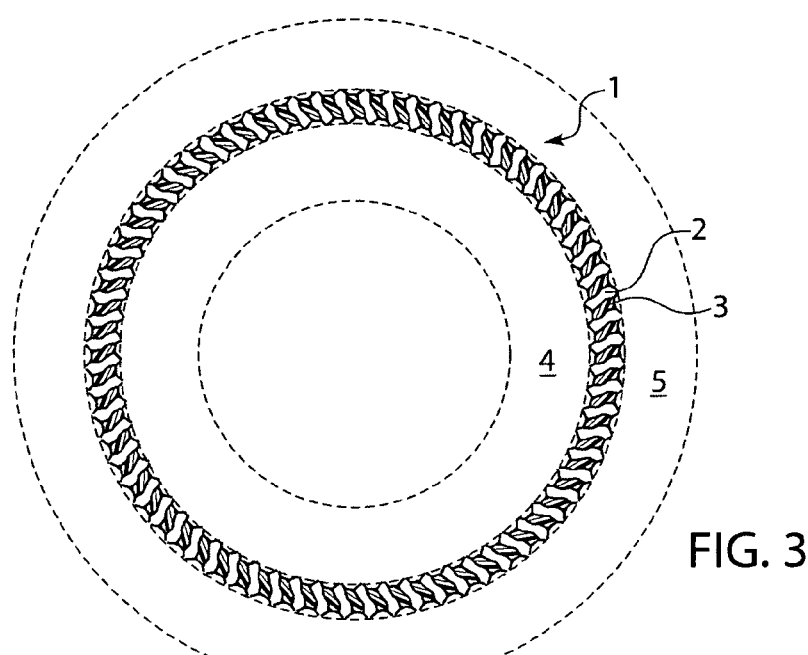
FIG. 3 shows a third embodiment of the torsional vibration damper.

FIG. 3 shows a further embodiment of the torsional vibration damper 1 with a multiplicity of equidistantly distributed clamping elements 2 and intermediate elements 3. In contrast to the embodiments illustrated in FIG. 1 and in FIG. 2, the intermediate elements 3 do not completely fill the region positioned in the radial direction between the clamping elements 2. As a result, the cylindrical outer surface of the machine part 4 or the cylindrical inner surface of the machine part 5 is only contacted by the clamping elements 2 and the torsional vibration damper 1 can act at the same time as a freewheel. Torsional vibration dampers 1 of this type, which can serve at the same time as a freewheel, are also referred to below as one-way torsional vibration dampers.

Figure 4:
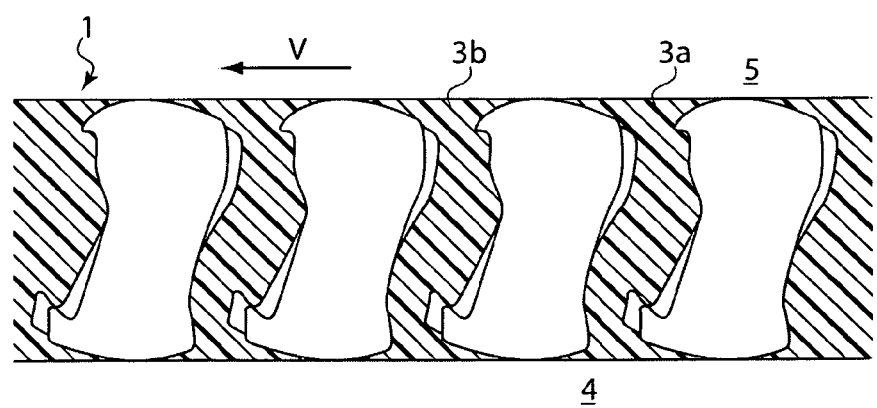
FIG. 4 shows a detail from a fourth embodiment of the torsional vibration damper.

FIG. 4 shows a detail from a further embodiment of the torsional vibration damper 1. The torsional vibration damper 1 illustrated in FIG. 4 is of strip-shaped design and can be divided to the desired peripheral length and placed between the cylindrical outer surface of the machine part 4 and the cylindrical inner surface of the machine part 5. In the embodiment illustrated in FIG. 4, the intermediate element 3 substantially completely fills the space positioned in the circumferential direction between two adjacent clamping bodies 12 such that the contour of the clamping body 12 as far as the outer contact surface 12*a* and the inner contact surface 12*b* is completely in contact with the intermediate element 3*a* or 3*b*. The outer contact surface 12*a* and the inner contact surface 12*b* form clamping contact surfaces which form a clamping contact with the cylindrical inner surface of the machine part 5 and with the cylindrical outer surfaces of the machine part 4, respectively.

FIG. 4 shows the clamping bodies 12 simultaneously in a first position and in a second position—partially superimposed on the first position. The clamping bodies 12 are in the second position if the outer contact surface 12*a* is rotated in the direction of rotation V relative to the inner contact surface 12*b* by formation of frictional contact. The intermediate elements 3 located adjacent to the respective clamping bodies 12—for example the intermediate elements 3*a* and 3*b* with respect to the clamping bodies 12 provided with a reference number in FIG. 4—are fixedly connected to the clamping body and are correspondingly deformed owing to their elastic material behavior upon displacement of the clamping body 12 between the two positions. At the same time, during said deformation of the intermediate elements 3*a*, 3*b*, the internal friction thereof causes damping of the torsional vibrations which occur.

It is furthermore possible to produce the intermediate elements 3*a* and 3*b* which are located adjacent to each other from different materials, in particular from materials having differing elasticity.

Figure 5:
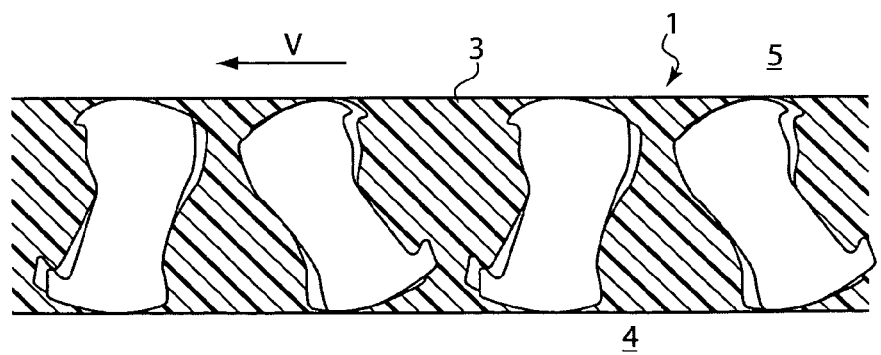
FIG. 5 shows a detail from a fifth embodiment of the torsional vibration damper.

FIG. 5 shows a further embodiment of a torsional vibration damper 1. The clamping bodies 22 and 32 which are located adjacent to each other are molded tilted in opposite directions to each other into the intermediate element 3. By means of the clamping bodies 22 and 32 being arranged in such a manner with respect to each other tilted with respect to the radial direction, the torsional vibration damper illustrated in FIG. 5 is configured so as to be able to transmit an increased torque in both directions of rotation.

As in FIG. 4, the clamping bodies 22 and 32 in FIG. 5 are illustrated simultaneously in a first position and in a second position—partially superimposed on the first position—in which the clamping bodies 22 and 32 have been brought by displacement in the direction of the direction of rotation V. The intermediate element 3 in FIG. 5 is correspondingly also deformed by the clamping bodies 22, thus permitting damping of the torsional vibrations which occur.

Figure 6:
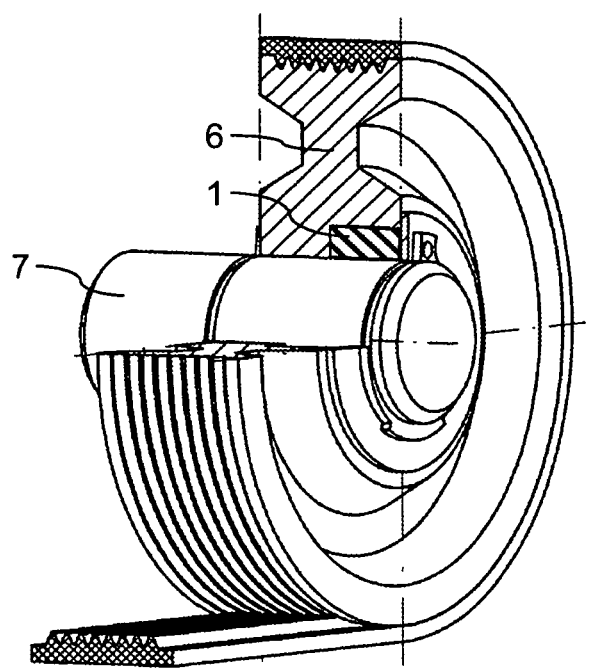
FIG. 6 shows a torsional vibration damper installed in a pulley.
Figure 7:
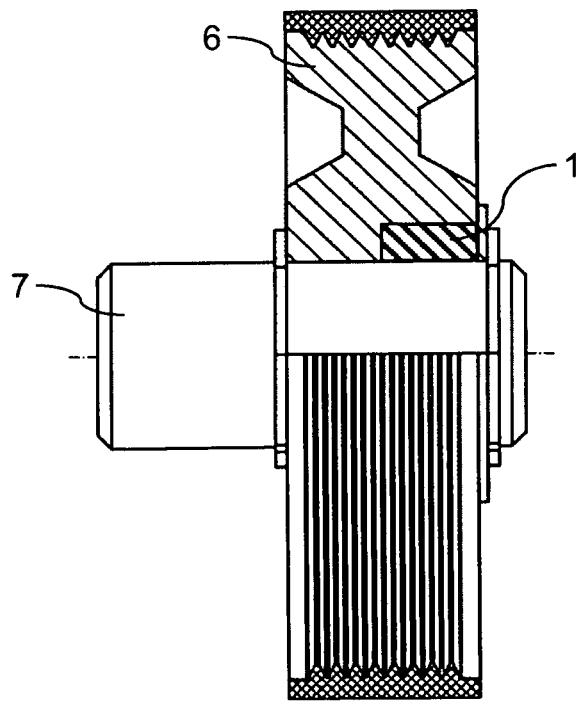
FIG. 7 shows another view of the torsional vibration dampener of FIG. 6.

FIG. 6 and FIG. 7 illustrate an application of the torsional vibration damper 1 by way of example. A pulley 6 sits with a sliding fit on the shaft 7. A torsional vibration damper 1 is fitted between the cylindrical inner surface of the pulley 6 and the cylindrical outer surface of the shaft 7. This ensures that the pulley 6 is fitted without being unbalanced and in a manner running true. In addition, the torsional vibration damper 1 permits the transmission of a torque between the pulley 6 and the shaft 7. At the same time, the torsional vibration damper 1 ensures that torsional vibrations which may occur are damped.

Figure 8:
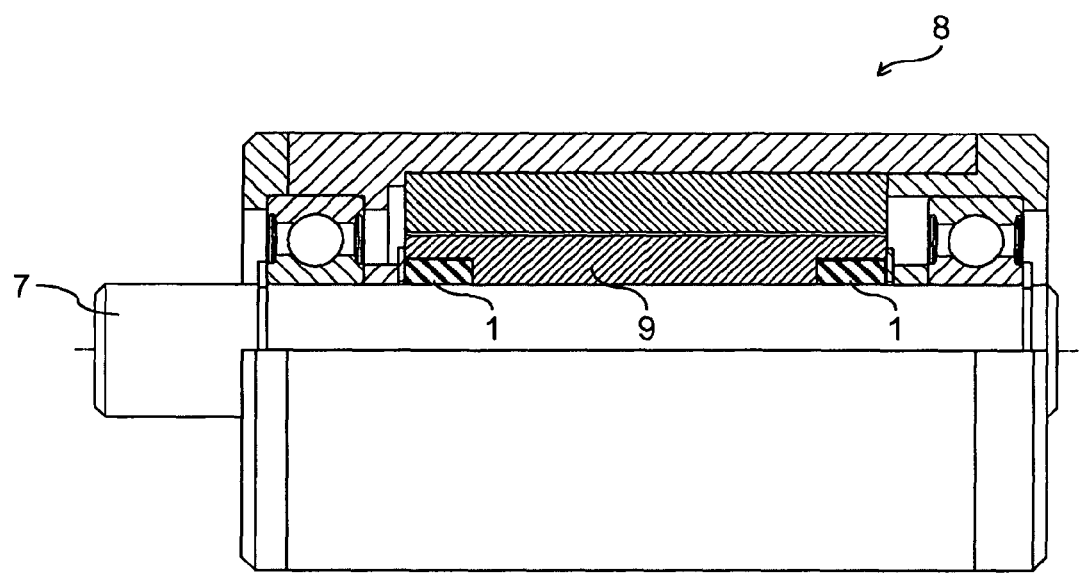
FIG. 8 shows a torsional vibration damper installed in an electric motor.

FIG. 8 shows a partial sectional illustration of a further installation example, in which two torsional vibration dampers 1 are installed in an electric motor 8 as used, for example, in motor spindles. The stator 9 of the electric motor 8 is not pressed onto the shaft 7 but rather sits with a sliding fit on the shaft 7. The torque produced by the electric motor 8 is transmitted to the shaft 7 via the torsional vibration damper 1.

In the case of an electric motor 8 operated in both directions of rotation, use could be made here of, for example, two one-way torsional vibrations dampers acting in opposite directions.

LIST OF DESIGNATIONS

1 Torsional vibration damper
2 Clamping body
3, 3*a*, 3*b* Intermediate element
4 Machine part
5 Machine part
6 Pulley
7 Shaft
8 Electric motor
9 Stator
12 Clamping body
12*a* Outer contact surface
12*b* Inner contact surface
22 Clamping body
22*a* Outer contact surface
22*b* Inner contact surface
32 Clamping body
V Direction of rotation

The invention claimed is:

1. A torsional vibration damper (1) for coupling two machine parts arranged coaxially with respect to each other, in particular for coupling a cylindrical inner surface of a first machine part (5) to a cylindrical outer surface of a second machine part (4), wherein the torsional vibration damper (1) has a multiplicity of clamping bodies (2) and a multiplicity of intermediate elements (3, 3*a*, 3*b*), and wherein the intermediate elements (2, 12, 22, 32) are more elastic than the clamping bodies (3, 3*a*, 3*b*), are arranged between adjacent clamping bodies (3, 3*a*, 3*b*), and completely fill the region present in the radial direction between the clamping bodies.

2. The torsional vibration damper (1) as claimed in claim 1, wherein each clamping body (2, 12, 22, 32) has an outer contact surface (12*a*, 12*b*) for forming frictional contact with an outer clamping track, in particular with the cylindrical inner surface of the first machine part (5), and an inner contact surface (12*b*, 22*b*) for forming frictional contact with an inner clamping track, in particular with the cylindrical outer surface of the second machine part (4).

3. The torsional vibration damper (1) as claimed in claim 1, wherein the intermediate elements (3, 3*a*, 3*b*) are designed so as to fix the clamping bodies (2, 12, 22, 32) in position and to cushion said clamping bodies.

4. The torsional vibration damper (1) as claimed in claim 1, wherein the intermediate elements (3, 3*a*, 3*b*) are connected to the clamping bodies (2, 12, 22, 32), in particular are connected thereto in a cohesively bonded manner.

5. The torsional vibration damper (1) as claimed in claim 1, wherein the intermediate elements (3, 3*a*, 3*b*) correspond in contour to the contour of the adjacent clamping bodies (2, 12, 22, 32).

6. The torsional vibration damper (1) as claimed in claim 1, wherein at least one clamping body (2, 12, 22, 32) is arranged tilted in relation to the radial direction between adjacent intermediate elements (3, 3*a*, 3*b*).

7. The torsional vibration damper (1) as claimed in claim 1, wherein two clamping bodies (22, 32) arranged adjacent to each other are bonded each tilted in an opposite direction in relation to the radial direction into the intermediate elements (3).

8. The torsional vibration damper (1) as claimed in claim 1, wherein the intermediate elements (3, 3*a*, 3*b*) consist of a plurality of different materials.

9. The torsional vibration damper (1) as claimed in claim 1, wherein the elasticity of at least one intermediate element (3, 3*a*, 3*b*) varies along the radial direction.

10. The torsional vibration damper (1) as claimed in claim 1, wherein the intermediate elements (3, 3*a*, 3*b*) are at least partially composed of a silicone, an elastomer, a thermoplastic polymer and/or a thermosetting polymer.

11. The torsional vibration damper (1) as claimed in claim 1, wherein the torsional vibration damper (1) is of strip-shaped design.

12. The torsional vibration damper (1) as claimed in claim 1, wherein the torsional vibration damper (1) is of annular design.

13. A spindle, in particular a motor spindle, with a torsional vibration damper (1) as claimed in claim 1.

* * * * *